United States Patent
Harter

(10) Patent No.: US 11,654,767 B2
(45) Date of Patent: May 23, 2023

(54) MOTOR VEHICLE WITH COOLING AIR FLAP DEVICE

(71) Applicant: Dr. Ing. h.c. F. Porsche Aktiengesellschaft, Stuttgart (DE)

(72) Inventor: Sebastian Harter, Weissach (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 17/391,062

(22) Filed: Aug. 2, 2021

(65) Prior Publication Data
US 2022/0041049 A1    Feb. 10, 2022

(30) Foreign Application Priority Data
Aug. 5, 2020    (DE) .................... 10 2020 120 624.0

(51) Int. Cl.
*B60K 11/08*    (2006.01)

(52) U.S. Cl.
CPC .................................. *B60K 11/085* (2013.01)

(58) Field of Classification Search
CPC ........................ B60K 11/085; B60Y 2400/301
See application file for complete search history.

(56) References Cited

U.S. PATENT DOCUMENTS

| | | | |
|---|---|---|---|
| 10,710,450 B2 | 7/2020 | Solazzo | |
| 11,207,973 B1* | 12/2021 | Vaddiraju | B60K 11/085 |
| 11,433,760 B2 | 9/2022 | Solazzo et al. | |
| 2004/0262458 A1 | 12/2004 | Demange et al. | |
| 2006/0060401 A1* | 3/2006 | Bole | B62D 35/001 180/68.1 |
| 2006/0102399 A1* | 5/2006 | Guilfoyle | B60K 11/085 180/68.1 |
| 2015/0197147 A1* | 7/2015 | Koh | B60K 11/085 310/198 |
| 2015/0298539 A1* | 10/2015 | Solazzo | B60K 11/085 454/143 |
| 2018/0086199 A1* | 3/2018 | Solazzo | G01R 33/07 |
| 2019/0191491 A1* | 6/2019 | Tsigkopoulos | H05B 3/26 |
| 2020/0215900 A1* | 7/2020 | Kim | B60K 11/085 |

FOREIGN PATENT DOCUMENTS

| | | |
|---|---|---|
| DE | 102011111110 A1 | 2/2013 |
| DE | 102011089035 A1 | 6/2013 |
| DE | 102014207566 A1 | 10/2015 |
| DE | 102015224924 A1 | 6/2017 |
| DE | 102019118006 A1 | 1/2021 |
| FR | 3052712 A1 | 12/2017 |
| WO | WO 2008087320 A2 | 7/2008 |

* cited by examiner

*Primary Examiner* — Kurt Philip Liethen
(74) *Attorney, Agent, or Firm* — Leydig, Voit & Mayer, Ltd.

(57) ABSTRACT

A cooling air flap device is for a motor vehicle. The cooling air flap device has a cooling air opening through which cooling air can flow. The cooling air flap device has: a cooling air flap, which is arranged in or on the cooling air opening so as to be adjustable in order to change an opening cross section of the cooling air opening through which the cooling air can flow; and a sensor configured to sense surroundings in a region of the cooling air flap device. The sensor is secured to the cooling air flap so that the sensor is adjustable together with the cooling air flap.

20 Claims, 3 Drawing Sheets

MOTOR VEHICLE WITH COOLING AIR FLAP DEVICE

CROSS REFERENCE TO RELATED APPLICATIONS

This application claims benefit to German Patent Application No. DE 10 2020 120 624.0, filed on Aug. 5, 2020, which is hereby incorporated by reference herein.

FIELD

The present invention relates to a cooling air flap device for a motor vehicle. The invention also relates to a motor vehicle which is equipped with at least one such cooling air flap device.

BACKGROUND

A large number of different sensors are used to increase the comfort and safety in motor vehicles, in particular in passenger cars. In the present context, sensors for sensing surroundings of the vehicle are of particular significance here, said sensors serving, in particular, to avoid collisions of the vehicle with obstacles. What are referred to as PDC sensors are of particular significance in this respect, where PDC stands for Park Distance Control, and is generally referred to as a parking aid. Such PDC systems operate with a plurality of PDC sensors which are arranged distributed along the bodywork of the vehicle. The number of PDC sensors which are necessary for a respective PDC system also varies in accordance with the scope of the functionality of the system. As a rule, in PDC systems without steering assistance use is made of four sensors respectively at the rear and at the front of the vehicle. In contrast, in PDC systems with steering assistance, six sensors are generally used at the front and at the rear of the vehicle, respectively. These PDC sensors are installed here in the front trim and rear trim, in particular clipped in. In this context, specifications relating to the installation height, distance between one another and sensing angles have to complied with so that the positioning of the respective sensor on the front or rear of the vehicle is not freely selectable. In particular, the necessary sensor positions can collide with other vehicle components which are on the front and/or on the rear and are unsuitable for integration of such a sensor, which makes the integration of the sensors more difficult and can entail costly reshaping of the respective vehicle component. For example, a sensor position in the region of a radiator grille and in the region of cooling air openings which serve to let cooling air in or out is conceivable. This installation position is particularly problematic if the opening cross section, through which there can be a flow, of the cooling air opening can be changed by means of adjustable cooling air flaps and the sensor position lies in the region of such an adjustable cooling air flap.

A cooling air flap device of the generic type is known, for example, from DE 10 2011 089 035 A1. Accordingly, such a cooling air flap device comprises a cooling air opening through which cooling air can flow, and at least one cooling air flap which is arranged in or on the cooling air opening so as to be adjustable in order to change an opening cross section of the cooling air opening through which the cooling air can flow. In the known cooling air flap device, the respective cooling air opening is assigned a plurality of cooling air flaps which each extend horizontally.

DE 10 2011 111 110 A1 discloses securing a front strobe light of an emergency vehicle, in particular for the police, fire service and rescue services, on a horizontally extending fixed bar of a radiator grille.

US 2004/0 262 458 A1 discloses attaching a sensor to a horizontally extending fixed bar of a radiator grille.

WO 2008/087320 A2 discloses inserting a PDC sensor between two horizontally extending fixed bars of a radiator grille and attaching it thereto.

SUMMARY

In an embodiment, the present disclosure provides a cooling air flap device that is for a motor vehicle. The cooling air flap device has a cooling air opening through which cooling air can flow. The cooling air flap device has: a cooling air flap, which is arranged in or on the cooling air opening so as to be adjustable in order to change an opening cross section of the cooling air opening through which the cooling air can flow; and a sensor configured to sense surroundings in a region of the cooling air flap device. The sensor is secured to the cooling air flap so that the sensor is adjustable together with the cooling air flap.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
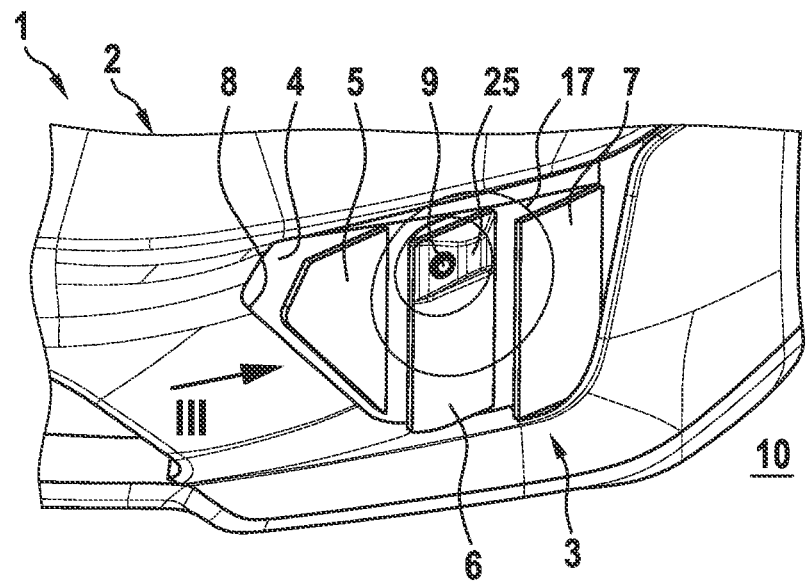
FIG. 1 shows an isometric view of a vehicle in the region of a cooling air flap device in a first flap position.
Figure 2:
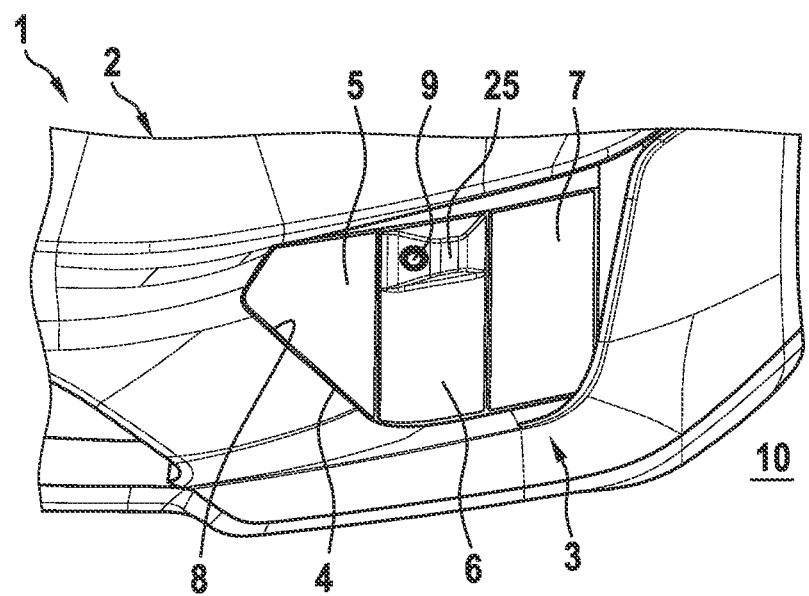
FIG. 2 shows a view similar to that in FIG. 1, but in a second flap position.

The present invention provides a new way for accommodating a sensor on the bodywork of a vehicle. In particular, a way is shown for arranging such a sensor in the region of a cooling air opening.

An aspect of the present invention is based on the general idea of arranging a sensor on a cooling air flap, which is arranged in or on a cooling air opening so as to be adjustable in order to change an opening cross section of the cooling air opening through which the cooling air can flow. In other words, the sensor is mounted on an adjustable cooling air flap in such a way that it can be adjusted together with the cooling air flap. While all previously known sensors have been mounted in a fixed fashion on the bodywork, the present invention proposes a new way, specifically mounting the sensor on an adjustable component, so that the sensor also becomes adjustable.

In an embodiment of the present invention, a cooling air flap device is equipped with a sensor for sensing surroundings in the region of the cooling air flap device, wherein the sensor is secured to the cooling air flap so that the sensor can be adjusted together with this cooling air flap.

The cooling air flap device can expediently have a frame which surrounds the cooling air opening. The respective cooling air flap is arranged, in particular mounted, in an adjustable fashion on this frame, and/or in such a way that it can pivot about a pivoting axis. In this context, an embodiment is preferred in which in the installed state of the cooling air flap device the pivoting axis extends essentially vertically on the vehicle. However, an embodiment with a horizontal pivoting axis or with a pivoting axis which can be inclined in any desired way with respect to the horizontal and the vertical is basically also conceivable.

The cooling air flap device can expediently have a plurality of cooling air flaps, which are expediently arranged next to one another and preferably parallel to one another and are in particular adjustable, preferably together, about pivoting axes which extend parallel to one another. If a plurality of cooling air flaps are provided for varying the cross section, through which there can be a flow, of the cooling air opening, an embodiment is preferred in which just one of these cooling air flaps is equipped with such a sensor.

According to one advantageous embodiment, the cooling air flap device can have an actuator for adjusting the respective cooling air flap, which actuator is mechanically coupled to the respective cooling air flap. Furthermore, the cooling air flap device can expediently have a control device (controller) for actuating the actuator, which control device is electrically coupled to the actuator and has an electrical interface for receiving cooling air requirement signals which are correlated with a cooling air requirement of the vehicle and surroundings sensing requirement signals which are correlated with a surroundings sensing requirement of the vehicle.

A cooling air requirement can be signaled, for example, when a coolant in a cooling circuit of the vehicle, which serves, for example, to cool an engine or a battery or passenger compartment air, reaches a predetermined limiting temperature. By opening the opening cross section it is possible to open, in the installed state, a flow path in which a heat exchanger of the respective cooling circuit is arranged, against which and through which heat exchanger cooling air is then made to flow. A flow inlet or a flow outlet can be controlled by the cooling air flap in accordance with the positioning of the cooling air flap device.

A surroundings sensing requirement of the vehicle occurs, in particular, when the vehicle is being maneuvered, and preferably when the vehicle is being parked or moved out of the parking space. In this case, the surroundings sensing requirement can in the simplest case be defined by the current vehicle speed. For example, at a vehicle speed below a predetermined limiting speed, which can be, for example, 50 km/h, there may be a requirement for the surroundings of the vehicle to be sensed. At a vehicle speed above the limiting speed there is, in contrast, no requirement to determine the surroundings of the vehicle using the sensor which is of interest here.

The control device can then be configured or programmed in such a way that if there is no surroundings detection requirement, said control device actuates the actuator as a function of the cooling air requirement in order to adjust the respective cooling air flap in order to change the opening cross section of the cooling air opening through which there can be a flow. If, in contrast, there is a surroundings sensing requirement, this is taken into account by the control device to the effect that the control device actuates the actuator independently of the cooling air requirement, in order to adjust the respective cooling air flap into a predetermined sensor flap position in which the sensor can sense predetermined surroundings, assigned to the sensor, in the region of the cooling air flap device.

This means that the control device differentiates two cases from one another. In the first case there is no surroundings sensing requirement so that the function of the sensor is not the key consideration. The control device can then adjust the respective cooling air flap as a function of the current cooling air requirement, by corresponding actuation of the actuator, in such a way that an opening cross section, adapted to the current cooling air requirement, is set at the cooling air opening. The greater the cooling air requirement, the greater the extent to which the cooling air opening is opened and the larger the opening cross section through which there can be a flow. At the same time, the opening width of the cooling air opening can, however, also depend on the current speed of the vehicle so that, for example, when there is a specific cooling air requirement it is conceivable that the opening cross section through which there can be a flow is reduced again correspondingly as the speed of the vehicle increases. It is important that the respective cooling air flap which is equipped with the sensor can in this first case also assume flap positions which deviate from the sensor flap position mentioned above, so that in these other flap positions the sensor does not assume its predetermined spatial position and cannot sense the surroundings that are assigned to it in the region of the cooling air flap device. The sensor is therefore not available for the sensing of the surroundings which is provided.

In contrast, in the second case there is a surroundings sensing requirement so that the function of the sensor is important. For this purpose, the sensor must assume its predetermined sensor position. This occurs in the predetermined sensor flap position of the cooling air flap, which is equipped with the sensor. Accordingly, in this second case the control device adjusts the respective cooling air flap into this sensor flap position by means of the actuator so that the sensor assumes the sensor position which is necessary to sense the surroundings assigned to the sensor. In this second case, the surroundings sensing requirement is, as it were, superordinate to the cooling air requirement, so that the control device adjusts the respective cooling air flap into its sensor flap position independently of the current cooling air requirement.

If in a simple case the surroundings sensing requirement is determined on the basis of the vehicle speed, the adaptation of the opening cross section through which there can be a flow to the current cooling air requirement occurs only above a predetermined limiting speed, which is preferably in a range from 30 to 50 km/h, since there is then no surroundings sensing requirement. If, in contrast, the vehicle speed is below this limiting speed, there is a surroundings sensing requirement so that the predetermined sensor flap position is set and the opening cross section is constant for the duration of this state and is no longer adapted as a function of the cooling air requirement.

According to one advantageous development, this sensor flap position of the respective cooling air flap can be an open position of the respective cooling air flap in which the opening cross section of the cooling air opening is at least partially opened, that is to say not closed. In this respect, a through-flow of the cooling air opening is made possible in the sensor or flap position. In particular, this permits minimum cooling to be implemented.

According to another embodiment, the respective cooling air flap can have a flap outer side, facing the surroundings, and a flap inner side, facing away from the surroundings. The surroundings of the cooling air flap device are located outside the vehicle when the cooling air flap device is positioned on the vehicle.

There can expediently be provision that the sensor is arranged and/or secured on the flap inner side, and in this context engages in a flap passage opening and ends at the flap outer side. The sensor preferably finishes flush with the cooling air flap on the flap outer side. In this context, the sensor can be attached to the cooling air flap in any desired conventional fashion. The sensor is preferably clipped to the cooling air flap.

In another development, the cooling air flap can have, on the flap inner side, an inwardly protruding screening element which forms, in the open positions of the respective cooling air flap in which the opening cross section of the cooling air opening is at least partially opened, a sight guard and/or flow guard or wind protection which at least partially conceals the sensor. This means that the screening element is selected in respect of positioning and dimensioning in such a way that in an open position of the cooling air flap the sensor cannot be seen directly from the outside and/or there cannot be a direct flow against it from the outside. In addition to this optical sight guard, the screen also at the same time forms a mechanical flow guard which protects the sensor against being directly subjected to relative wind or to the cooling air flow. In particular, if the cooling air opening forms a cooling air inlet, the screening element can at the same time also serve as a protection of the sensor against particles such as e.g. dust, sand, water droplets, snow and hail which are carried along in the air stream.

Another development proposes that the screening element is shaped so as to implement a reduced flow-around resistance. Accordingly, the screening element is advantageously aerodynamically shaped. In particular, the screening element can have a droplet-shaped cross section. In this context, the aerodynamically favorable cross section is oriented parallel to the main through-flow direction of the cooling air opening or parallel to the main flow-around direction of the cooling air flap. As a result, the aerodynamically disruptive contour of the sensor on the cooling air flap in the cooling air opening is reduced.

In another embodiment, the cooling air flap which has the sensor can have a lamellae carrier which is arranged in an adjustable fashion on a frame, surrounding the cooling air opening, of the cooling air flap device. Furthermore, the cooling air flap which has the sensor can have a lamellae diaphragm which is attached to the lamellae carrier. This lamellae diaphragm defines the flap outer side, in particular in respect of contour and visual appearance. This multi-part design of the respective cooling air flap which has the sensor makes it possible to simplify its mounting in the cooling air flap device.

According to a particularly advantageous development there may now be provision that the sensor is attached to the lamellae diaphragm. For example, clip elements or latching elements can be constructed or arranged on the lamellae diaphragm on the flap inner side, or integrally formed therefrom, and the sensor can easily be secured to the lamellae diaphragm with them.

Another embodiment provides that the screening element mentioned above is arranged or constructed on the lamellae carrier or integrally formed therefrom. In particular, the lamellae carrier can be an off-tool injection molded part. Likewise, the lamellae diaphragm can be an off-tool injection molded part. By assigning the attachment means to the lamellae diaphragm, and by assigning the screening element to the lamellae carrier a particularly simple and cost-effective way of implementing this multi-part cooling air flap is made possible.

In another embodiment, the cooling air flap which has the sensor can have a projection in the area of the sensor which protrudes over the rest of the cooling air flap on a flap outer side facing the surroundings and which forms, on a flap inner side facing away from the surroundings, a depression into which the sensor is inserted. The projection is in particular aerodynamically advantageous, that is to say is shaped with a view to a reduced flow-around resistance on the flap outer side. Accommodating the sensor within the depression reduces the risk of a disruptive interaction with the sensor during the flow around the flap inner side. As a result, the functionality of the cooling air flap device is improved.

A vehicle according to an embodiment of the invention, which may be preferably a passenger car, is equipped with a bodywork and has at least one cooling air flap device of the type described above. The respective cooling air flap device is arranged here on the bodywork. The respective cooling air flap device can be arranged here on a front of the vehicle or on a rear of the vehicle. In particular, at the same time a plurality of such cooling air flap devices can be arranged on the vehicle. It is conceivable, for example, that such a cooling air flap device is respectively arranged on the left and on the right of the front of the vehicle next to a centrally arranged radiator grille.

Further exemplary features and advantages of the invention emerge from the drawings and from the associated description of the figures with reference to the drawings.

Of course, the features which are mentioned above and the features which are still to be explained below can be used not only in the respectively given combination but also in other combinations or alone without departing from the scope of the invention. Components of a superordinate unit, such as e.g. of a device, of an apparatus or of an arrangement, which are mentioned above and which are still to be explained below and are denoted separately can form separate components or elements of this unit or integral areas or sections of this unit, even if this is illustrated differently in the figures.

Preferred exemplary embodiments of the invention are illustrated in the drawings and are explained in more detail in the following description, wherein identical reference symbols relate to identical or similar or functionally identical components.

According to FIGS. 1 to 4, a motor vehicle 1 comprises a bodywork 2, which is likewise only illustrated partially here. The vehicle 1 may be basically any land vehicle. However, it is preferably a road vehicle. Embodiments as a truck or omnibus or some other utility vehicle are conceivable. However, an embodiment as a passenger car is preferred. In FIGS. 1 to 4, a front region of the vehicle 1 which is configured as a passenger car is represented. With respect to the direction of travel of the vehicle 1, this is the left-hand front region. The bodywork 2 of the vehicle 1 is equipped with a cooling air flap device 3 in this left-hand front region. It is clear that the vehicle 1 can be equipped with a plurality of such cooling air flap devices 3. For example, a further cooling air flap device 3 can be arranged on the right-hand vehicle side, in a mirror-symmetrical fashion with respect to this cooling air flap device 3 which is arranged on the left. Other positionings on the front or on the rear of the vehicle 1 are also conceivable.

The respective cooling air flap device 3 has a cooling air opening 4 through which cooling air can flow. The cooling air flap device 3 has at least one cooling air flap 5, 6, 7. Purely by way of example and without limitation of the general applicability, the cooling air flap device 3 represented here has precisely three cooling air flaps 5, 6, 7 which are arranged in an adjustable fashion in or on the cooling air opening 4 in order to change an opening cross section, through which the cooling air can flow, of the cooling air opening 4. For this purpose, the cooling air flaps 5, 6, 7 can each be pivotable about a pivoting axis, for example, on a frame 8, surrounding the cooling air opening 4, of the cooling air flap device 3. In the example shown, the respective pivoting axis extended essentially vertically, that is to say parallel to a Z axis of the vehicle 1.

The cooling air flap device 3 also has a sensor 9 which is configured to sense surroundings 10 of the vehicle 1 in the region of the cooling air flap device 3. The sensor 9 is in particular a distance sensor. The sensor 9 is preferably a PDC sensor. The sensor 9 can operate, for example, with ultrasonic waves. This sensor 9 can form, in particular, a component of a surroundings sensing system 29, in particular a PDC system, which comprises a plurality of such sensors 9 and whose system controller 30 is indicated in FIG. 3 and is coupled electrically to the respective sensor 9 via signal lines 28.

The sensor 9 is secured to one of the cooling air flaps 5, 6, 7, specifically here preferably to the middle cooling air flap 6. As a result, the sensor 9 can be adjusted relative to the cooling air opening 4, together with this cooling air flap 6.

Figure 3:
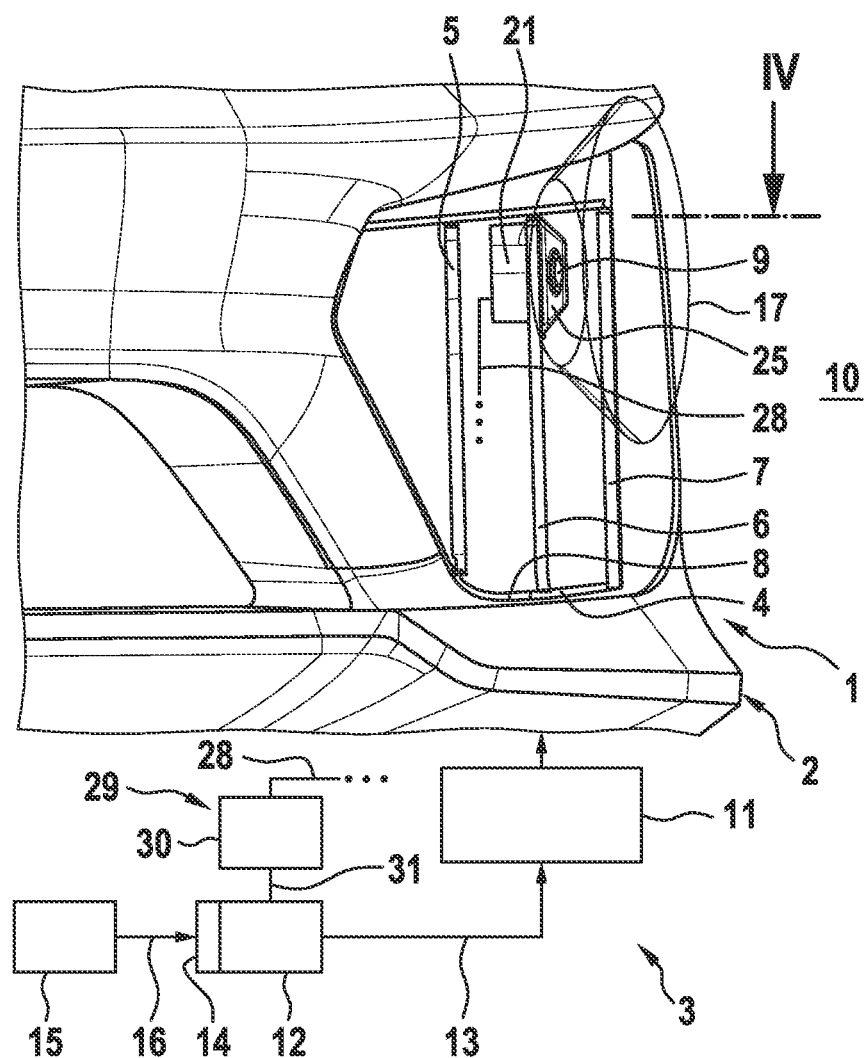
FIG. 3 shows a further view of the vehicle in the region of the cooling air flap device according to a viewing direction III, indicated by an arrow in FIGS. 1 and 4, with further components which are indicated in the form of a circuit diagram.

FIG. 3 shows in the manner of a circuit diagram and by way of example for all the figures that the cooling air flap device 3 can also be equipped with an actuator 11 which is configured to adjust the cooling air flaps 5, 6, 7. For this purpose, the actuator 11 is mechanically coupled to the respective cooling air flap 5, 6, 7. Furthermore, the cooling air flap device 3 according to FIG. 3 can be equipped with a control device 12 which is configured to actuate the actuator 11. For this purpose, the control device 12 is electrically coupled to the actuator 11 via a corresponding control line 13. The control device 12 has an electrical interface 14 via which the control device 12 can be electrically coupled, for example, to a control device 15 of the vehicle 1, e.g. by a signal line 16. Via this interface 14 the control device 12 can receive electrical cooling air requirement signals which correlate to the cooling air requirement of the vehicle 1, and electrical surroundings sensing requirement signals which correlate with a surroundings sensing requirement of the vehicle. The cooling air requirement can depend, for example, on the current temperature of a coolant which circulates in a cooling circuit of the vehicle 1. The surroundings sensing requirement can correlate, for example, to the current vehicle speed. For example, a current low vehicle speed can indicate maneuvering or parking of the vehicle so that there is a requirement for sensing of the surroundings. At higher vehicle speeds there is, in contrast, no requirement to sense the immediate surroundings of the vehicle. Accordingly, the surroundings 10 of the vehicle 1 which are to be sensed by the respective sensor 9 relates, as it were, to an area in proximity to the vehicle 1 which is e.g. at maximum 5.00 meters, preferable less than 3.00 meters.

Figure 4:
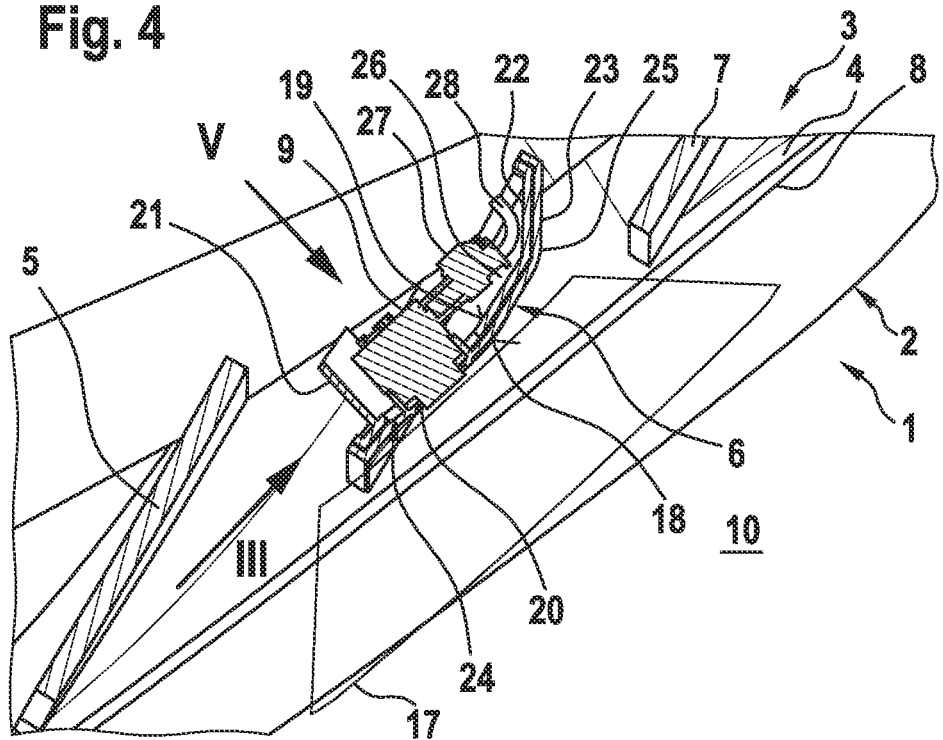
FIG. 4 shows a sectional plan view of the motor vehicle in the region of the cooling air flap device according to a sectional line IV in FIG. 3.

The control device 12 is expediently configured and/or programmed in such a way that in the event of there being no surroundings detection requirement the control device 12 actuates the actuator 11 as a function of the cooling air requirement in order to adjust the cooling air flaps 5, 6, 7 in order to change the opening cross section, through which there can be a flow, of the cooling air opening 4. In particular, the cooling air flaps 5, 6, 7 can be adjusted at least between a closed position (represented in FIG. 2) in which the cooling air opening 4 is closed, and the opening cross section through which there can be a flow assumes, as it were, the value 0, and at least one open position which is represented in FIGS. 1, 3 and 4. However, a plurality of open positions can preferably be set. In particular, as it were any desired number of open positions can be able to be set. In the respective open position, the cooling air flaps 5, 6, 7 clear to a greater or lesser extent the opening cross section, through which there can be a flow, of the cooling air opening 4, so that cooling air can flow through the cooling air opening 4.

The control device 12 is also configured and/or programmed in such a way that if there is a surroundings detection requirement the control device 12 actuates the actuator 11 independently of the current cooling air requirement in order to adjust all the cooling air flaps 5, 6, 7 or at least the air flap 6 which is equipped with the sensor 9 into a predetermined sensor flap position. In this sensor flap position, the sensor 9 which is secured to this cooling air flap 6 assumes a sensor position which is specified for the satisfactory functioning of the sensor 9, so that the sensor 9 can sense the surroundings 10 assigned to it, in the region of the cooling air flap device 3. The sensor flap position of the cooling air flap 6 which is equipped with the sensor 9 is preferably an open position.

The open position of the cooling air flaps 5, 6, 7 which is represented in FIGS. 1, 3 and 4 corresponds in the case of the middle cooling air flap 6 equipped with the sensor 9 to the sensor flap position in which the associated sensor 9 assumes its predetermined sensor position. In FIGS. 1, 3 and 4, an irradiation cone 17 is indicated by virtue of which the sensor 9 operates in order to detect the surroundings. In particular, the irradiation cone 12 is formed by means of ultrasonic waves here.

In all the other open positions and in the closed position (shown in FIG. 2) of the cooling air flaps 5, 6, 7, the position of the sensor 9 deviates at least with respect to its irradiation angle, from the sensor position which is necessary for the satisfactory sensor function, so that it is then not possible to carry out any satisfactory or reliable detection of the surroundings using this sensor 9.

For this reason, there may be in particular provision that the control device 12 is also electrically coupled e.g. via an electrical lead 31, to the surroundings sensing system 29 into which the sensor 9 of the fresh air flap device 3 shown here is integrated. The control device 12 can then signal to this surroundings sensing system 29 whether the sensor 9 of the fresh air flap device 3 is ready to detect the surroundings, that is to say assumes its anticipated sensor position or not. In this way, incorrect measurements by the surroundings sensing system 29 can be avoided.

According to FIG. 4, at least the cooling air flap 6 which is equipped with the sensor 9 has a flap outer side 18 facing the surroundings 10 and a flap inner side 19 facing away from the surroundings 10. The sensor 9 is arranged on the flap inner side 19 and engages in this context into a flap passage opening 20 and ends at the flap outer side 18.

Figure 5:
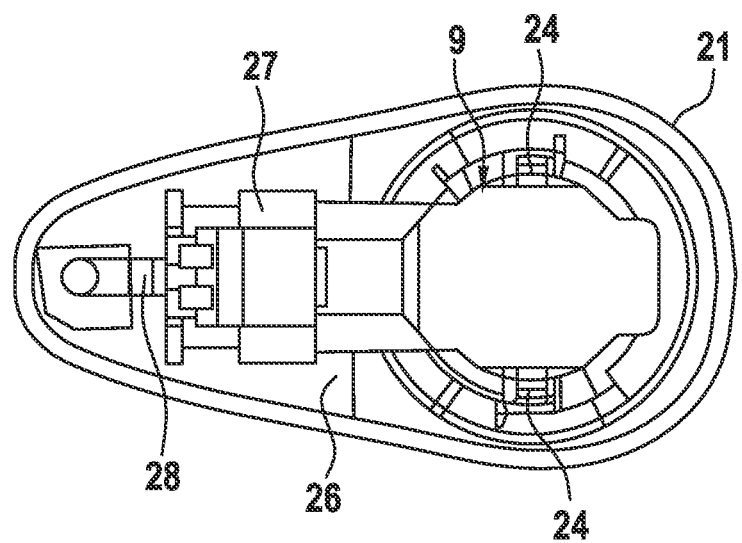
FIG. 5 shows an enlarged view of the region of a sensor of a cooling air flap corresponding to a viewing direction V, indicated by an arrow in FIG. 4.

According to FIGS. 4 and 5, the cooling air flap 6 which is equipped with the sensor 9 has, on the flap inner side 19, an inwardly protruding screening element 21. This screening element 21 forms, in the open positions of the respective cooling air flap 6, a sight guard and flow guard which conceal the sensor 9. In the viewing direction represented in FIG. 3, according to the arrow III in FIG. 4, only the screening element 21 which serves as a sight guard can accordingly be seen, while the sensor 9 which is arranged on the flap inner side 19 is concealed thereby and cannot be seen. According to FIG. 5, the screening element 21 has an aerodynamically favorable shape. In the view in FIG. 5, the screening element 21 is in the shape of a droplet, as a result of which an aerodynamically favorable, that is to say low-resistance flow around of the screening element 21 and therefore of the sensor line can be achieved.

According to FIG. 4, the cooling air flap 6 which has the sensor 9 has a lamellae carrier 22 which is arranged in an adjustable fashion on the frame 8. Furthermore, this cooling air flap 6 has a lamellae diaphragm 23 which is attached to the lamellae carrier 22. For example, a clip connection or latching connection can be provided here. The sensor 9 is then attached to the lamellae diaphragm 23. For example, the sensor 9 is secured to the lamellae diaphragm 23 by means of a latching connection or clip connection 24. The flap-side attachment means can be formed integrally from the lamellae diaphragm 23 here. The abovementioned screening element 21 is, in contrast, arranged or constructed on the lamellae carrier 22. The screening element 21 is preferably formed integrally from the lamellae carrier 22.

According to FIGS. 1 to 5, the cooling air flap 6 which has the sensor 9 has a projection 25 in the region of the sensor 9. This projection 25 protrudes beyond the rest of the cooling air flap 6 on the flap outer side 18. In addition, the projection 25 forms a depression 26 on the flap inner side 19. The sensor 9 is inserted into this depression 26. In particular, an electrical connection 27 of the sensor 9 can also be inserted into this depression 26. The sensor 9 can be, for example, electrically connected to the surroundings sensing system 29 via this connection 27, through the corresponding signal line 28.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cooling air flap device for a motor vehicle, the cooling air flap device having a cooling air opening through which cooling air can flow, the cooling air flap device comprising:
    a cooling air flap, which is arranged in or on the cooling air opening so as to be adjustable in order to change an opening cross section of the cooling air opening through which the cooling air can flow; and
    a sensor configured to sense surroundings in a region of the cooling air flap device, the sensor being secured to the cooling air flap so that the sensor is adjustable together with the cooling air flap,
    wherein the cooling air flap has a flap outer side, facing the surroundings, and a flap inner side, facing away from the surroundings,
    wherein the sensor is arranged on the flap inner side, engages in a flap passage opening, and ends at the flap outer side, and
    wherein the cooling air flap has, on the flap inner side, an inwardly protruding screening element which forms, in at least one open position of the respective cooling air flap in which the opening cross section of the cooling air opening is at least partially opened, a sight guard or flow guard which conceals the sensor.

2. The cooling air flap device as claimed in claim 1, comprising:
    an actuator configured to adjust the cooling air flap, the actuator being mechanically coupled to the cooling air flap; and
    a controller configured to actuate the actuator, the controller being electrically coupled to the actuator and having an electrical interface configured to receive cooling air requirement signals, which are correlated with a cooling air requirement of the motor vehicle, and surroundings sensing requirement signals, which are correlated with a surroundings sensing requirement of the motor vehicle,
    wherein the controller is configured or programmed in such a way:
    that based on determining that there is no surroundings detection requirement, the controller actuates the actuator as a function of the cooling air requirement in order to adjust the respective cooling air flap in order to change the opening cross section of the cooling air opening through which there can be a flow, and
    that based upon determining that there is a surroundings sensing requirement, the controller actuates the actuator independently of the cooling air requirement in order to adjust the respective cooling air flap into a predetermined sensor flap position in which the sensor is capable of sensing the surroundings assigned to it, in the region of the cooling air flap device.

3. The cooling air flap device as claimed in claim 2, wherein the sensor flap position of the cooling air flap is an open position of the respective cooling air flap in which the opening cross section of the cooling air opening is at least partially opened.

4. The cooling air flap device as claimed in claim 1, wherein the screening element is shaped for reduced flow-around resistance.

5. The cooling air flap device as claimed in claim 1, wherein the cooling air flap which has the sensor has a lamellae carrier which is arranged in an adjustable fashion on a frame, surrounding the cooling air opening, of the cooling air flap device,
  wherein the cooling air flap which has the sensor has a lamellae diaphragm which is attached to the lamellae carrier, and
  wherein the sensor is attached to the lamellae diaphragm.

6. The cooling air flap device as claimed in claim 1, wherein the screening element is arranged or constructed on the lamellae carrier or integrally formed therefrom.

7. The cooling air flap device as claimed in claim 1, wherein the cooling air flap which has the sensor has a projection in the area of the sensor which protrudes over the rest of the cooling air flap on a flap outer side facing the surroundings and which forms, on a flap inner side facing away from the surroundings, a depression into which the sensor is inserted.

8. A motor vehicle, having a bodywork and comprising the cooling air flap device as claimed in claim 1, wherein the cooling air flap device is arranged on the bodywork.

9. The cooling air flap device as claimed in claim 1, wherein the cooling air flap is configured to be adjustable between an open position and a closed position, and wherein the sensor is configured to be in a position necessary to sense surroundings of the motor vehicle in the open position.

10. The cooling air flap device as claimed in claim 9, wherein in the closed position of the cooling air flap, the sensor is configured to not carry out detection of surroundings of the motor vehicle.

11. A cooling air flap device for a motor vehicle, the cooling air flap device having a cooling air opening through which cooling air can flow, the cooling air flap device comprising:
  a cooling air flap, which is arranged in or on the cooling air opening so as to be adjustable in order to change an opening cross section of the cooling air opening through which the cooling air can flow; and
  a sensor configured to sense surroundings in a region of the cooling air flap device, the sensor being secured to the cooling air flap so that the sensor is adjustable together with the cooling air flap,
  wherein the cooling air flap which has the sensor has a lamellae carrier which is arranged in an adjustable fashion on a frame, surrounding the cooling air opening, of the cooling air flap device,
  wherein the cooling air flap which has the sensor has a lamellae diaphragm which is attached to the lamellae carrier, and
  wherein the sensor is attached to the lamellae diaphragm.

12. The cooling air flap device as claimed in claim 11, comprising:
  an actuator configured to adjust the cooling air flap, the actuator being mechanically coupled to the cooling air flap; and
  a controller configured to actuate the actuator, the controller being electrically coupled to the actuator and having an electrical interface configured to receive cooling air requirement signals, which are correlated with a cooling air requirement of the motor vehicle, and surroundings sensing requirement signals, which are correlated with a surroundings sensing requirement of the motor vehicle,
  wherein the controller is configured or programmed in such a way:
  that based on determining that there is no surroundings detection requirement, the controller actuates the actuator as a function of the cooling air requirement in order to adjust the respective cooling air flap in order to change the opening cross section of the cooling air opening through which there can be a flow, and
  that based upon determining that there is a surroundings sensing requirement, the controller actuates the actuator independently of the cooling air requirement in order to adjust the respective cooling air flap into a predetermined sensor flap position in which the sensor is capable of sensing the surroundings assigned to it, in the region of the cooling air flap device.

13. The cooling air flap device as claimed in claim 12, wherein the sensor flap position of the cooling air flap is an open position of the respective cooling air flap in which the opening cross section of the cooling air opening is at least partially opened.

14. A motor vehicle, having a bodywork and comprising the cooling air flap device as claimed in claim 11, wherein the cooling air flap device is arranged on the bodywork.

15. The cooling air flap device as claimed in claim 11, wherein the cooling air flap is configured to be adjustable between an open position and a closed position, and wherein the sensor is configured to be in a position necessary to sense surroundings of the motor vehicle in the open position.

16. A cooling air flap device for a motor vehicle, the cooling air flap device having a cooling air opening through which cooling air can flow, the cooling air flap device comprising:
  a cooling air flap, which is arranged in or on the cooling air opening so as to be adjustable in order to change an opening cross section of the cooling air opening through which the cooling air can flow; and
  a sensor configured to sense surroundings in a region of the cooling air flap device, the sensor being secured to the cooling air flap so that the sensor is adjustable together with the cooling air flap,
  wherein the cooling air flap which has the sensor has a projection in the area of the sensor which protrudes over the rest of the cooling air flap on a flap outer side facing the surroundings and which forms, on a flap inner side facing away from the surroundings, a depression into which the sensor is inserted.

17. The cooling air flap device as claimed in claim 16, comprising:
  an actuator configured to adjust the cooling air flap, the actuator being mechanically coupled to the cooling air flap; and
  a controller configured to actuate the actuator, the controller being electrically coupled to the actuator and having an electrical interface configured to receive cooling air requirement signals, which are correlated with a cooling air requirement of the motor vehicle, and surroundings sensing requirement signals, which are correlated with a surroundings sensing requirement of the motor vehicle,
  wherein the controller is configured or programmed in such a way:
  that based on determining that there is no surroundings detection requirement, the controller actuates the actuator as a function of the cooling air requirement in order to adjust the respective cooling air flap in order to change the opening cross section of the cooling air opening through which there can be a flow, and
  that based upon determining that there is a surroundings sensing requirement, the controller actuates the actuator independently of the cooling air requirement in order to adjust the respective cooling air flap into a predetermined sensor flap position in which the sensor is capable of sensing the surroundings assigned to it, in the region of the cooling air flap device.

18. The cooling air flap device as claimed in claim 17, wherein the sensor flap position of the cooling air flap is an open position of the respective cooling air flap in which the opening cross section of the cooling air opening is at least partially opened.

19. A motor vehicle, having a bodywork and comprising the cooling air flap device as claimed in claim 16, wherein the cooling air flap device is arranged on the bodywork.

20. The cooling air flap device as claimed in claim 16, wherein the cooling air flap is configured to be adjustable between an open position and a closed position, and wherein the sensor is configured to be in a position necessary to sense surroundings of the motor vehicle in the open position.

* * * * *